United States Patent
Darm

[15] 3,656,542
[45] Apr. 18, 1972

[54] VENTILATING SYSTEM FOR COMPARTMENTED BUILDINGS

[72] Inventor: William J. Darm, 2201 N. Kellingsworth, Portland, Oreg. 97211

[22] Filed: Apr. 23, 1970

[21] Appl. No.: 31,137

[52] U.S. Cl. ............................................................165/66
[51] Int. Cl. ..............................................................F28c 3/02
[58] Field of Search ............................................165/16, 66

[56] References Cited

UNITED STATES PATENTS 2,488,333  11/1949  Schlachter ..........................165/66 X Primary Examiner—John J. Camby
Attorney—Kolisch & Hartwell

[57] ABSTRACT

A high efficiency ventilation system for a compartmented building wherein heat from exhaust air removed from a region in the building is transferred, by means of an air-to-air heat exchanger, to fresh supply air being provided to the region, to regulate the delivery temperature of the latter.

9 Claims, 2 Drawing Figures

PATENTED APR 18 1972 3,656,542

WILLIAM J. DARM
INVENTOR.

BY Kolisch + Hartwell
ATTY.

3,656,542

VENTILATING SYSTEM FOR COMPARTMENTED BUILDINGS

BACKGROUND OF THE INVENTION

The present invention concerns an improved ventilation system for compartmented buildings. More particularly, the invention concerns a ventilation system wherein heat from the spent air of a compartment of the building is utilized to regulate the final delivery temperature of fresh air supplied to the compartment without mixing the spent air and fresh air.

In heating and ventilation of compartmented buildings, such as multistory office buildings, it is conventional to provide separate systems for the various compartmented areas of the buildings. Thus, the heating and ventilation requirements are quite different for the interior or core space of such buildings as opposed to the space adjacent the exterior walls, for example.

To be more specific, the usual air ventilation system for the exterior space of multistory buildings includes both hot and cold supplies to each floor. However, since the core space of the building rarely requires heating, it is usual to provide only a supply of cool air, having a temperature near 60° Fahrenheit for example, to each floor for the interior space. Separate regulating means are provided at each floor to add heat to the latter supply and control the final temperature of the air delivered to the interior space.

Furthermore, largely due to the effects of body heat of the occupants and heat generated by lighting systems, the exhaust air from both the core space and exterior space of multistory buildings is of relatively high temperature, whether the building is being heated or cooled. For example, it is not unusual for the exhaust air from the compartments of a multistory building to reach temperatures in the range of 90°–130° Fahrenheit.

Consequently, systems have recently been designed for utilizing heat from the spent air of building compartments to regulate the final temperature of the supply air to the compartments. This is generally done by mixing the spent exhaust air and the fresh supply air together, by means of various regulating equipment, to achieve the desired delivery temperature of supply air. It should be apparent that one reason for utilizing such systems is to recover heat that is normally lost with the exhaust air and to thereby increase the efficiency of the ventilation system. Another reason for the use of such systems is to provide an effective control for the final delivery temperature of the fresh air.

Building construction codes presently in force in most areas permit mixing of limited amounts of exhaust air to fresh supply air; and in some cases the added proportion of exhaust air may reach 25 percent of the supply volume. However, it should be clear that there are many reasons why such practice is not ideal. Specifically, the incorporated exhaust air is stale and contains significant amounts of pollutant materials such as smoke, carbon compounds and gas, for example. Furthermore, due to the limited space between floors in conventional buildings and other economic considerations, it is not feasible to provide separate filter means and humidity control equipment on each floor. Consequently, ventilation systems known in the prior art utilizing incorporated exhaust air are not capable of maintaining the ideal humidity control and air freshness possible with direct ventilation systems.

SUMMARY OF THE INVENTION

Accordingly, it is an object of the invention to provide an improved ventilation system having unique temperature control means for compartmented buildings.

It is another object of the invention to provide a high efficiency ventilation system which utilizes heat from the air exhausted from a space of the building to regulate the final temperature of the fresh air delivered to the space.

It is a further object of the invention to provide a high efficiency ventilation system for compartmented buildings which provides fresh, humidity controlled supply air of closely regulated temperature to all compartments of the building.

These and other objects of the invention are attained by a ventilation system which features separate supply and exhaust systems for the building compartments. The warm air exhausted from a compartment of a building and the cool, fresh air supplied to the compartment are counterflowed through an air-to-air heat exchanger. Transfer of heat between the fresh and exhaust air is achieved and the supplies are completely isolated from each other. Regulating means are provided to selectively control the amount of warm exhaust air flowing through the heat exchanger to closely control the delivery temperature of the supply air to the other compartment. Since the supply air is delivered through a completely closed system of ducts, effective filtering and humidity control is possible by means of a conventional central control located on the building roof or in the basement.

BRIEF DESCRIPTION OF THE DRAWINGS

Other objects and advantages of the present invention will become apparent from the following detailed description of the invention when taken in conjunction with the accompanying drawings, wherein.

DETAILED DESCRIPTION OF THE INVENTION

Figure 1:
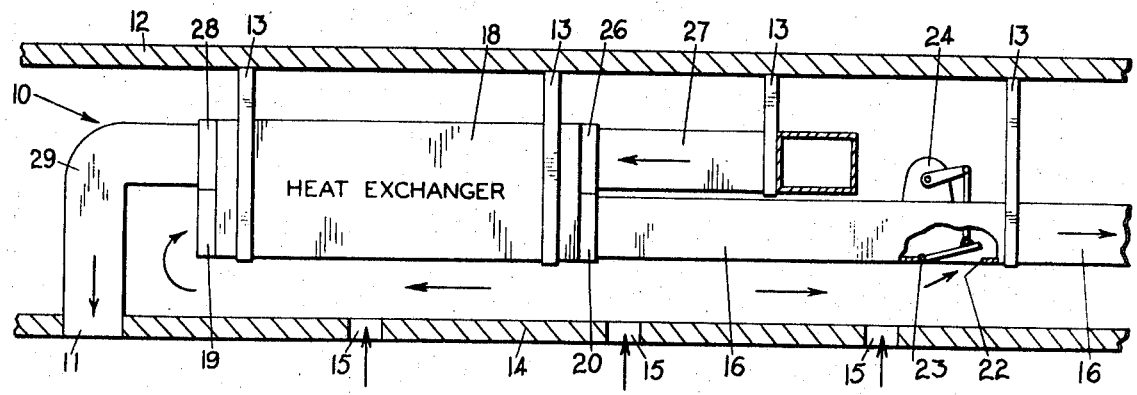
FIG. 1 is a right elevation view in partial section of the utility area between the ceiling and floor of a multistory building, showing features of the ventilation system of the invention.

Referring now to FIG. 1, a utility space 10 is generally indicated, of the type usually found in a multiple level building, between a ceiling 14 of an office on one level and a floor 12 of the next highest level of the building. As indicated by the flow arrows, ventilating air of controlled temperature is supplied in conventional fashion to the lower level office, through a diffuser 11 in the ceiling and exhausted through ceiling vents 15 to space 10.

Various ventilation equipment is located within space 10 supported in the conventional fashion from the bottom surface of floor 12 by suitable members 13. More specifically, an air-to-air heat exchanger 18 is provided adapted to promote heat exchange between two separate counterflowing supplies of air of different temperatures. The exchanger is of conventional design and might comprise an exchanger of the type described in U. S. Pat. No. 3,381,747 to William J. Darm.

Exchanger 18 includes a first inlet duct 19 communicating with space 10 and a first outlet duct 20 connected to a return air duct 16. Return air duct 16 is connected to a main return duct, not shown, through which the return air is eventually forced by a return fan to the open atmosphere. Return duct 16 also includes a vent opening or passage means 22 formed therein on the downstream side of the exchanger the size of the opening is adjusted through making adjustments in adjustable means or door 23 such door being moved under the force of a thermostatically controlled motor 24. What is referred to as a heat dissipating course in the exchanger connects inlet duct 19 to outlet duct 20.

Exchanger 18 further includes a second inlet duct 26 adapted to receive fresh supply air from supply duct 27 which provides fresh supply air of a predetermined temperature from a source, not shown. The exchanger also includes a second outlet duct 28 which is connected to a supply duct 29 for furnishing ventilation air of regulated temperature to the diffuser 11. What is referred to as a heat receiving course in the exchanger connects inlet duct 26 and outlet duct 28.

For purposes of explaining the operation of the elements of FIG. 1, it may be assumed that the space 10 comprises an office space of the building adapted to receive ventilating air from a first supply at a desired room temperature. In that event, it might be expected that the exhaust air vented to space 10 will be of a temperature in the range of 90°–130° Fahrenheit. It may also be assumed that supply duct 29 contains air of a temperature below room temperature, for example near 60° Fahrenheit, from a main supply source.

To regulate the delivery temperature of the supply air, the latter is forced through the heat exchanger while spent air from space 10 is counterflowed through the exchanger. Consequently, heat from the spent air is transferred to the supply air until the latter reaches a suitable delivery temperature. Precise temperature regulation is attained by controlling the volume of exhaust air flowing through the heat exchanger, by means of the thermostatically controlled motor 24. Thus, when the motor controlled door 23 is closed all the air exhausted from space 10 is forced through the exchanger. However, when the door is opened, a draft is created downstream of the exchanger and the volume of exhaust air forced through the exchanger is significantly reduced. This results in a lower heat exchange rate within the exchanger and a lower delivery temperature of the supply air. The motor controlled door, the vent or vent opening 22 and the inlet duct 19 function as a proportioning means in the construction.

It should be apparent that the apparatus described permits the utilization of heat from exhaust air which would otherwise be wasted and thereby significantly increases the efficiency of the building ventilation system. Furthermore, the increase in efficiency is derived without contaminating the supply air or interfering with filtering and humidity control of the supply air by means of equipment located in a central station elsewhere in the building. Finally, the invention provides an independent temperature control means for each compartment of the building.

Figure 2:
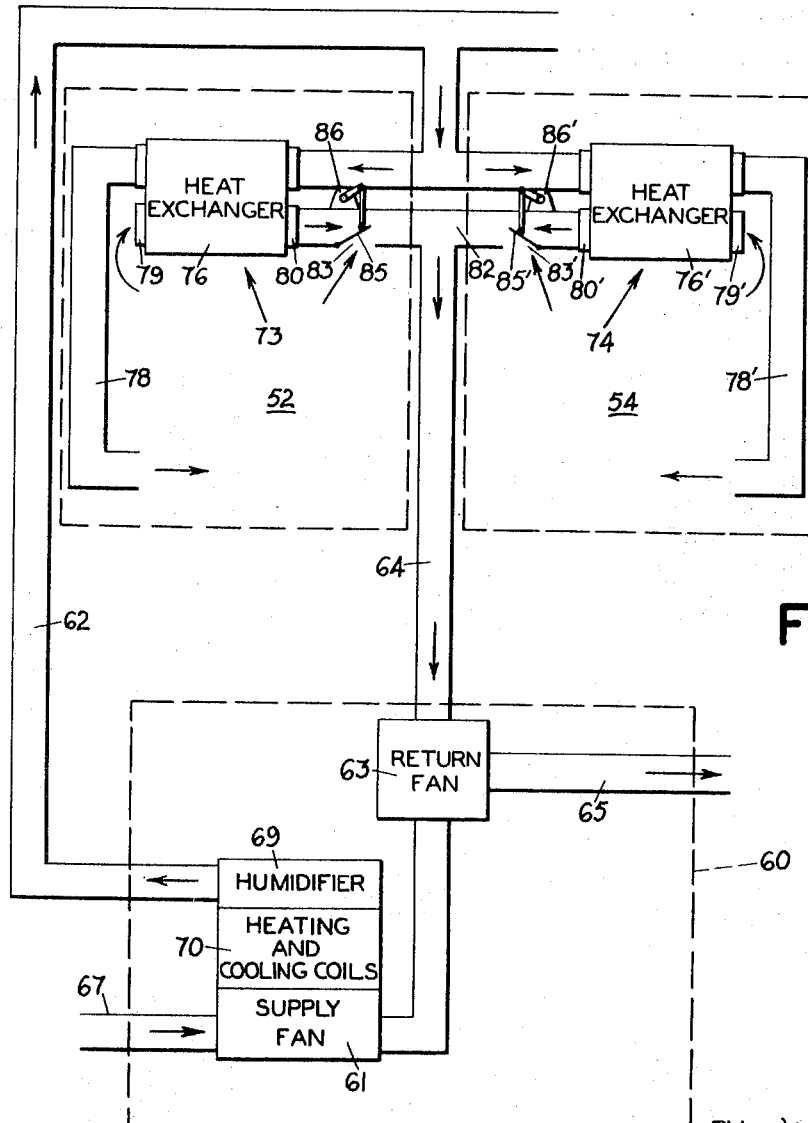
FIG. 2 is a partial schematic diagram illustrating a ventilation system designed in accordance with the invention.

Referring now to FIG. 2, a system is shown including equipment similar to that of FIG. 1 for ventilation of one or more compartments 52, 54 in accordance with the invention by utilizing heat derived from the exhaust air of the compartments. While multiple compartments have been shown, the system of the invention may be used with one compartment.

As shown, a central ventilation station 60 is provided of the type usually installed in the basement or upon the roof of a compartmented building. Station 60 is adapted to condition and furnish fresh supply air under the force of supply fan 61 through a main supply duct 62, and is adapted to receive and vent polluted exhaust air under the draft of return fan 63 from a main return duct 64. The exhaust air is discharged to the atmosphere through a discharge duct 65 and makeup air is supplied to the system via a makeup duct 67 which communicates with the atmosphere, all in conventional manner. In addition, the usual humidifiers 69 and heating and cooling coils 70 are provided to condition the air supplied to duct 62.

Identical ventilation units 73, 74 are provided for compartments 52, 54, respectively. Each of the units is constructed and arranged like the equipment of FIG. 1. Only unit 73 will be described, it being understood that unit 74 is similar in construction and operation.

Unit 73 includes an air-to-air heat exchanger 76 secured within the utility space above compartment 52. The exchanger is adapted to receive fresh supply air of about 60° Fahrenheit from main duct 62, and is arranged to deliver conditioned supply air of a desired room temperature, for example near 70° Fahrenheit to compartment 52 via duct 78. Exchanger 76 further includes an exhaust air network comprising inlet 79 adapted to receive exhaust air from compartment 52, as well as an exhaust outlet 80 adapted to deliver the exhaust air to return duct 82. The return duct includes a vent opening 83 downstream of the exchanger adapted to be selectively opened or closed by means of door 85 controlled by motor 86. The exhaust air is finally delivered from return duct 82 to the main return duct 64. In a manner similar to the operation of the elements of FIG. 1, the exhaust air is flowed through the exchanger in a direction opposite the flow of supply air therethrough. Heat derived from the exhaust air is transferred to the supply air being conditioned by the exchanger to a final delivery temperature for compartment 52.

The system described includes filtering and humidity control of the supply air and utilizes heat from the exhaust air without incorporating pollutants therefrom. While two building compartments have been shown supplied in parallel with supply air from duct 62 and serviced by return air duct 64, it should be understood that any additional number of units desired could be incorporated in a similar system.

It is claimed:

1. A ventilating system for a building with means for regulating temperature in selected regions of the building including,
   an air-to-air heat exchanger for each of said selected regions, each exchanger having a heat receiving course and a heat dissipating course;
   a fresh air supply duct;
   an air return duct;
   a connection between the fresh air supply duct and the heat receiving course of each exchanger;
   a connection between the return duct and the heat dissipating course of each exchanger;
   an air diffuser connected to the heat receiving course of each exchanger for directing air from the receiving course into a selected region of the building; and
   proportioning means for channeling spent air from a selected region of the building into said return duct with part of said spent air traveling through the said heat dissipating course and part of said spent air bypassing said heat dissipating course.

2. A ventilating system as described in claim 1, wherein said proportioning means includes a vent formed in said return duct, cover means for selectively closing said vent, and temperature responsive means for controlling said cover means.

3. A ventilating system as described in claim 2 further including means for supplying fresh air to said supply duct at a temperature below the desired room temperature.

4. A ventilating system as described in claim 3, further including means for collecting spent air in an elevated portion of said spaces at an elevated temperature.

5. A ventilating system as described in claim 4, further including a central conditioning station connected to said air supply duct and said air return duct for filtering and conditioning said fresh air.

6. Ventilation apparatus for a building having a compartment comprising,
   an air-to-air heat exchanger having a pair of heat exchanging courses extending therethrough,
   a fresh air supply duct and means connecting said supply duct to one end of one of said courses,
   an air diffuser connected to the opposite end of said one course for directing air from said one course into said compartment,
   an air return duct through which spent air is exhausted from the compartment and means connecting said air return duct to one end of the other of said pair of courses,
   first passage means accommodating air flow from said compartment into the opposite end of said other course thus to introduce air into said air return duct,
   second passage means accommodating air flow from said compartment into said air return duct with such bypassing the said other course of the exchanger thus to introduce air into said return duct, and
   adjustable means operable on adjustment thereof to change in the air introduced into said air return duct the proportion of such air which is introduced by said first passage means and the proportion of such air which is introduced by said second passage means.

7. The apparatus of claim 6 wherein said compartment is bounded by a ceiling and a utility space in the building is provided above said ceiling, the exchanger is located above said ceiling in said utility space, and said first and second passage means communicate with said compartment through said ceiling.

8. The apparatus of claim 6, wherein said adjustable means is thermostatically controlled.

9. Ventilating apparatus for a building with means for regulating the temperature of air in selected regions of the building comprising, an air-to-air heat exchanger for each of said selected regions, each exchanger having a heat receiving course and a heat dissipating course, a fresh air supply duct and a connection between the fresh air supply duct and one end of the heat receiving course of each exchanger, an air diffuser connected to the opposite end of the heat receiving course of each exchanger for directing air from the receiving course into a selected region of the building, an air return duct, and proportioning means for each exchanger for channeling spent air from a selected region of the building into said air return duct with part of said air traveling through said heat dissipating course of the exchanger and part of said spent air bypassing said heat dissipating course.

* * * * *